(12) United States Patent
Yasukagawa

(10) Patent No.: US 7,977,808 B2
(45) Date of Patent: Jul. 12, 2011

(54) GENERATOR FOR ROTOR

(75) Inventor: Makoto Yasukagawa, Natori (JP)

(73) Assignee: Kabushiki Kaisha Senryou, Toyama (JP)

( * ) Notice: Subject to any disclaimer, the term of this patent is extended or adjusted under 35 U.S.C. 154(b) by 0 days.

(21) Appl. No.: 12/922,474

(22) PCT Filed: May 20, 2009

(86) PCT No.: PCT/JP2009/059267
§ 371 (c)(1), (2), (4) Date: Oct. 12, 2010

(87) PCT Pub. No.: WO2009/142239
PCT Pub. Date: Nov. 26, 2009

(65) Prior Publication Data
US 2011/0049907 A1    Mar. 3, 2011

(30) Foreign Application Priority Data

May 21, 2008  (JP) .................................. 2008-133550

(51) Int. Cl.
*F02B 63/04* (2006.01)

(52) U.S. Cl. ........ 290/1 C; 290/1 D; 290/1 E; 290/40 C; 290/4 C

(58) Field of Classification Search .................. 290/1 C, 290/1 D, 1 E, 4 C, 37 A, 40 A
See application file for complete search history.

(56) References Cited

U.S. PATENT DOCUMENTS

| | | | |
|---|---|---|---|
| 5,519,275 A * | 5/1996 | Scott et al. ..................... | 310/112 |
| 5,939,811 A * | 8/1999 | Enomoto et al. ............. | 310/12.27 |
| 6,744,146 B2 * | 6/2004 | Fulton et al. ................. | 290/37 A |
| 7,070,530 B2 * | 7/2006 | Ai et al. ............................ | 475/5 |
| 7,294,938 B2 * | 11/2007 | Miyao .............................. | 290/45 |
| 7,297,083 B2 * | 11/2007 | Duncan ............................. | 475/5 |
| 7,589,430 B2 * | 9/2009 | Nakamura et al. ........... | 290/40 R |
| 7,703,283 B2 * | 4/2010 | Barker ............................. | 60/608 |
| 7,713,157 B2 * | 5/2010 | Hastings et al. .................. | 475/2 |
| 7,736,266 B2 * | 6/2010 | Huang et al. ....................... | 477/3 |

(Continued)

FOREIGN PATENT DOCUMENTS

| | | |
|---|---|---|
| JP | A 8-503768 | 4/1996 |
| WO | WO 94/05972 | 3/1994 |

OTHER PUBLICATIONS

Office Action issued in Japanese Application No. 2008-133550, mailed Jul. 1, 2008. (with English-language translation).

(Continued)

*Primary Examiner* — T C Patel
*Assistant Examiner* — Iraj A Mohandesi
(74) *Attorney, Agent, or Firm* — Oliff & Berridge, PLC.

(57) ABSTRACT

Provided is a generator for a rotor, having a simple structure and being capable of enhancing power generation efficiency. A supporting member fixes or releases a slender shaft material to or from a rotor. Rotating members are disposed respectively at both ends of the shaft material 25 so as to be rotatable around the shaft material, which is a central axis. A control unit releases the fixation of the shaft material to the rotor when the direction of rotational movement of each of the rotating members around the shaft material is coincident with the direction of rotational movement of the rotor, thereby accelerating each of the rotating members. A power generation unit generates electricity by recovering energy obtained when each of the rotating members is accelerated by the rotation of the rotor.

1 Claim, 3 Drawing Sheets

U.S. PATENT DOCUMENTS

2007/0233357 A1* 10/2007 Sugai et al. .................. 701/105

OTHER PUBLICATIONS

Office Action issued in Japanese Application No. 2008-133550, mailed Sep. 2, 2008. (with English-language translation).

Office Action issued in Japanese Application No. 2008-133550, mailed Nov. 18, 2008. (with English-language translation).

International Search Report issued in Application No. PCT/JP2009/059267, mailed Jun. 16, 2009. (with English-language translation).

* cited by examiner

GENERATOR FOR ROTOR

TECHNICAL FIELD

The present invention relates to a generator for a rotor, generating electricity by recovering the rotational energy of a rotor.

BACKGROUND ART

Conventionally, as a device for generating electricity by recovering the rotational energy of a rotor, there is one that generates electricity by recovering the rotational energy of the earth using the precession motion of a gyroscope (for example, see PTL 1).

CITATION LIST

Patent Literature

PTL 1: Japanese Unexamined Patent Publication No. 08-503768

SUMMARY OF INVENTION

Technical Problem

However, the device of PLT 1 has a complicated structure because of the use of a gyroscope, and even when energy is obtained, the energy loss caused by friction or the like is large, causing low power generation efficiency.

The present invention has been made in view of these problems, and an object of the present invention is to provide a generator for a rotor, having a simple structure and being capable of enhancing power generation efficiency.

Solution to Problem

In order to achieve the above object, the generator for a rotor of the present invention, which generates electricity by recovering the rotational energy of a rotor, comprises a supporting member, a pair of rotating members, a control unit, and a power generation unit; the supporting member being disposed on the rotor and comprising a lower substrate that can be fixed to the surface of the rotor so as to rotate with the rotor, a supporting shaft fixed to the lower substrate, an upper substrate arranged at a predetermined distance from the lower substrate, timbers mounted on the upper substrate so as to extend vertically upward, and a slender shaft material mounted in the timbers so as to be almost parallel to the surface of the rotor, and the supporting member being capable of fixing the supporting shaft to the upper substrate or releasing the fixation of the supporting shaft to the upper substrate, thereby fixing or releasing the shaft material to or from the rotor; the rotating members being disposed respectively at both ends of the shaft material so as to be rotatable around the shaft material, which is a central axis, and being shifted by 180 degrees from each other relative to the center of rotation around the shaft material while rotating; the control unit releasing the fixation of the supporting shaft to the upper substrate so that the shaft material is independent of the rotation of the rotor when the direction of rotational movement of each rotating member around the shaft material is coincident with the direction of rotational movement of the rotor, thereby accelerating both ends of the shaft material as a result of being pulled by each rotating member, and the control unit fixing the supporting shaft to the upper substrate so that the shaft material rotates with the rotor when the direction of rotational movement of each rotating member around the shaft material is opposite to the direction of rotational movement of the rotor; the power generation unit generating electricity by recovering energy obtained when the both ends of the shaft material are accelerated by the rotation of the rotor, as the rotation of the upper substrate relative to the lower substrate.

The generator for a rotor of the present invention can generate electricity by recovering the rotational energy of a rotor based on the following principle. More specifically, as shown in FIG. 1, the rotor rotates in the horizontal plane at an angular velocity $\Omega$. A supporting member has a pole extending vertically from the surface of the rotor, and a shaft material is mounted on the upper part of the pole. Masses are concentrated in both ends of the shaft material at a distance l from the pole, and the masses are regarded as substances $m_2$. Rotating members $m_1$ each rotate in the vertical plane around the shaft material with a radius r at an angular velocity $\omega$.

When the shaft material is fixed to the rotor so as to rotate with the rotor, supposing that the mass of the rotor is much larger than the mass of each rotating member $m_1$, the substances $m_2$ rotate in a horizontal plane at a constant angular velocity $\Omega$, regardless of the rotation of each rotating member $m_1$. At this time, as shown in FIG. 2, since the turning radius of each substance $m_2$ is l, the velocity of each substance $m_2$ is $\Omega l$. On the other hand, the rotating members $m_1$ rotate around the respective substances $m_2$ in the direction of movement of the substances $m_2$ above or below the substances $m_2$, and rotate in the opposite direction to the direction of movement of the substances $m_2$ below or above the substances $m_2$. Accordingly, when the direction of rotational movement of each rotating member $m_1$ around each substance $m_2$ is coincident with the direction of movement of each substance $m_2$, the velocity of each rotating member $m_1$ is $\omega r + \Omega l$; whereas when the direction of rotational movement of each rotating member $m_1$ around each substance $m_2$ is opposite to the direction of movement of each substance $m_2$, the velocity is $\omega r - \Omega l$. Moreover, when each rotating member $m_1$ is on a level with each substance $m_2$, the horizontal velocity of each rotating member $m_1$ is $\Omega l$. Thus, the velocity of each rotating member $m_1$ increases by $2\Omega l$ and is thereby accelerated while each rotating member $m_1$ rotates from a position where the direction of rotational movement of each rotating member $m_1$ around each substance $m_2$ is opposite to the direction of rotational movement of each substance $m_2$, i.e., the direction of rotational movement of the rotor, to a position where the direction of rotational movement of each rotating member $m_1$ around each substance $m_2$ is coincident with the direction of rotational movement of each substance $m_2$, i.e., the direction of rotational movement of the rotor. The increase in the velocity is converted to an angular velocity $2\Omega l/r$.

Next, when the direction of rotational movement of each rotating member $m_1$ around each substance $m_2$ is coincident with the direction of movement of each substance $m_2$, thereby accelerating each rotating member $m_1$, and when the fixation of the shaft material to the rotor is released so that the shaft material is independent of the rotation of the rotor, the rotation of each rotating member $m_1$ affects the rotation of each substance $m_2$. That is, when the fixation of the shaft material to the rotor is released, since the velocity of each rotating member $m_1$ is $\omega r + \Omega l$, and the velocity of each substance $m_2$ is $\Omega l$, each substance $m_2$ is pulled by each rotating member $m_1$ and thereby accelerated, and the angular velocity increases. Conversely, the angular velocity of each rotating member $m_1$ decreases. Thereby, the substances $m_2$, namely the increase in the angular velocity of the shaft material, can be converted to potential energy etc. and then recovered.

When each rotating member $m_1$ rotates to the position where the direction of rotational movement of each rotating member $m_1$ around each substance $m_2$ is opposite to the direction of movement of each substance $m_2$, the velocity of each substance $m_2$ is adjusted to $\Omega l$, and the velocity of each rotating member $m_1$ is adjusted to $\omega r - \Omega l$. Then, the shaft material is refixed to the rotor so that the shaft material rotates with the rotor.

Supposing that the moment of inertia of each rotating member $m_1$ is $I_1$, the energy E obtained while each rotating member $m_1$ goes around to the substances $m_2$ is represented by the following formula:

$$E = \frac{I_1}{2r^2}(\omega r + \Omega l)^2 - \frac{I_1}{2r^2}(\omega r - \Omega l)^2 = \frac{2l}{r}I_1\omega\Omega \quad \text{Equation 1}$$

Since the moment of inertia I of a rod having a length r and a mass m is $I = mr^2/3$, when each rotating member $m_1$ is in the form of a bar, the following formula holds:

$$E = \frac{2l}{3r}I_1\omega\Omega \quad \text{Equation 2}$$

Supposing that the rotational frequency of each rotating member $m_1$ is f, the formula: $\omega = 2\pi f$ holds, and the power per unit time W is, because the formula: W=Ef holds, represented by the following formula:

$$W = \frac{4l}{3r}\pi I_1 \Omega f^2 \quad \text{Equation 3}$$

Thus, the generator for a rotor of the present invention recovers energy obtained when each rotating member is accelerated by the rotation of the rotor, and thereby generates electricity by the power generation unit. Moreover, the generator has a simple structure because no gyroscope is used. Accordingly, the energy loss caused by friction or the like can be prevented, and thereby power generation efficiency can be enhanced. In the generator for a rotor of the present invention, since the rotating members are shifted by 180 degrees from each other with respect to the center of rotation around the shaft material while rotating, when the rotor does not rotate, each rotating member can be rotated around the shaft material at a constant angular velocity.

In the generator for a rotor of the present invention, any rotor (e.g., the earth) may be used as the rotor as long as the mass thereof is much larger than the mass of each rotating member. When the earth is used as the rotor, the generator for a rotor of the present invention can generate electricity by recovering the energy of rotation of the earth. Additionally, when the earth is used as the rotor, wherever the generator is placed, the generator can generate electricity because the earth rotates one revolution for one day.

As a specific example, when the supporting member is mounted on the earth, supposing that the mass of each rotating member $m_1$ is 1 kg, r is 1 m, l is 1 m, and f is 1000 rotation per second, the following formula holds:

$$W = \frac{4 \times 1}{3 \times 1} \times 3.14 \times 7.27 \times 10^{-5} \times 10^6 = 304 \ [W] \quad \text{Equation 4}$$

The generator for a rotor of the present invention preferably has a pair of reversing members, which are disposed respectively at both ends of the shaft material so as to be rotatable around an axis parallel to the shaft material in the opposite direction to the rotation of each rotating member at the same rotational frequency as each rotating member, and which are shifted by 180 degrees from each other relative to the center of rotation thereof. In this case, the centrifugal force generated by the rotation of each rotating member can be compensated by the rotation of each reversing member. Therefore, vibration caused by the rotation of each rotating member can be prevented, and hence the device can be prevented from being damaged.

Advantageous Effects of Invention

The present invention provides a generator for a rotor, having a simple structure and being capable of enhancing power generation efficiency.

DESCRIPTION OF EMBODIMENTS

Embodiments of the present invention are described below with reference to the drawings.

Figure 1:
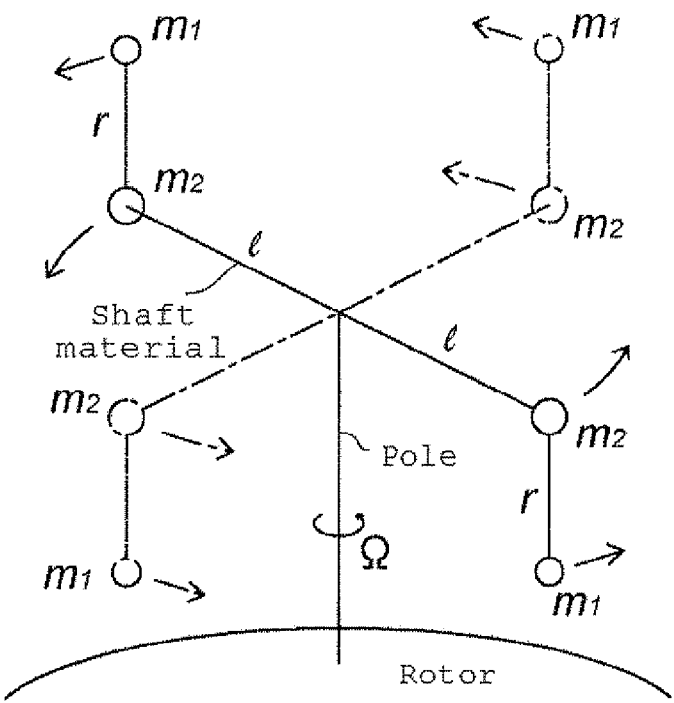
FIG. 1 is a perspective view illustrating the principle of the generator for a rotor of the present invention to recover the rotational energy of a rotor.
Figure 2:
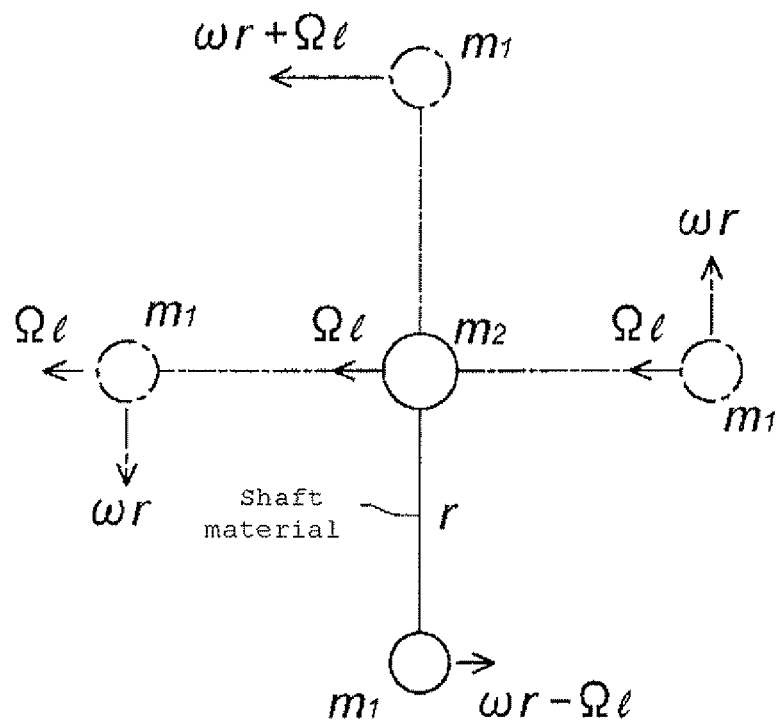
FIG. 2 is an enlarged side view illustrating the principle of the generator shown in FIG. 1 to recover the rotational energy of the rotor.
Figure 3:
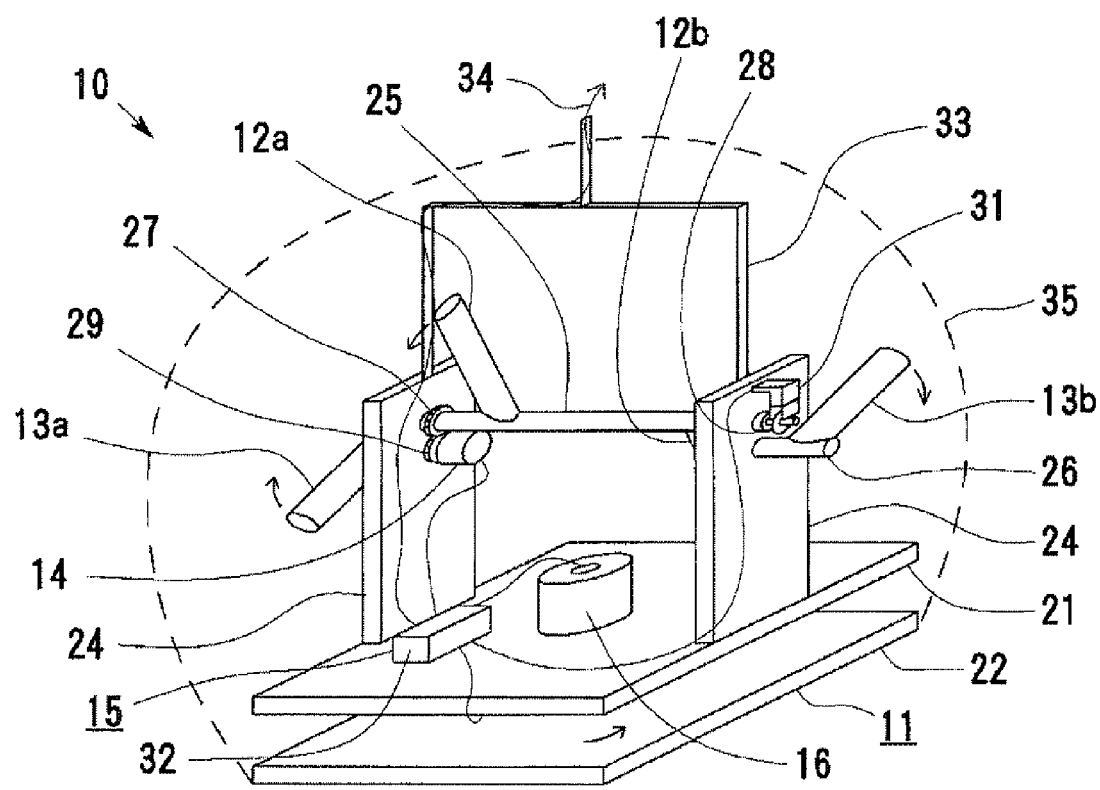
FIG. 3 is a perspective view of a generator for a rotor according to an embodiment of the present invention.
Figure 4:
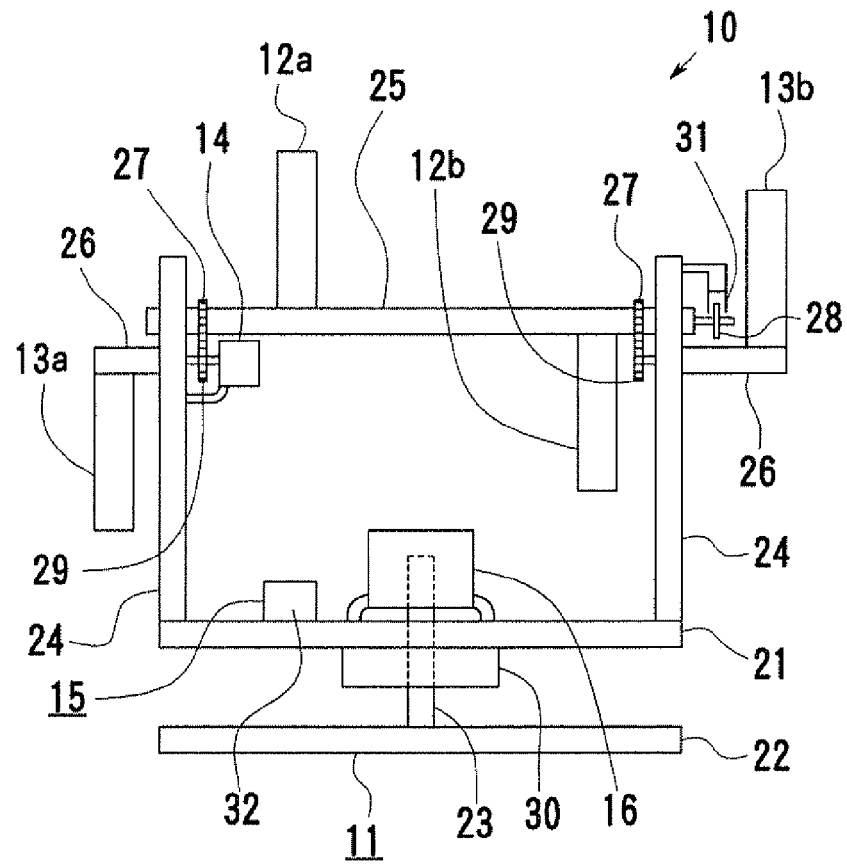
FIG. 4 is a front view of the generator shown in FIG. 3.
Figure 5:
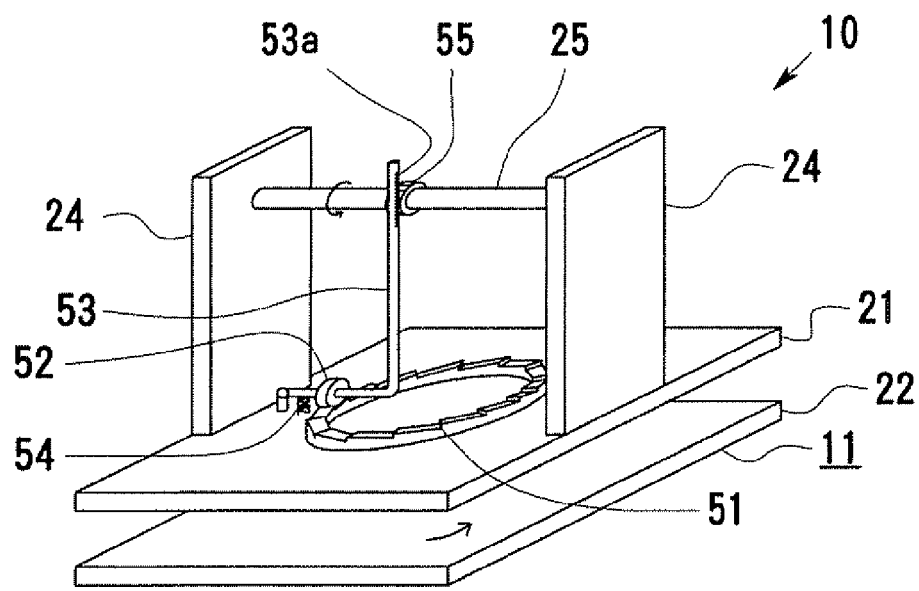
FIG. 5 is a perspective view of a modification of the generator shown in FIG. 3 (rotating members and reversal members are omitted).

FIGS. 3 to 5 show the generator for a rotor according to the embodiments of the present invention.

As shown in FIGS. 3 and 4, a generator 10 for a rotor generates electricity by recovering the rotational energy of a rotor, and comprises a supporting member 11, a pair of rotating members 12a and 12b, a pair of reversing members 13a and 13b, a rotation-driving unit 14, a control unit 15, and a power generation unit 16.

As shown in FIGS. 3 and 4, the supporting member 11 comprises an upper substrate 21, a lower substrate 22, a supporting shaft 23, a pair of timbers 24, a shaft material 25, and a pair of reversing shafts 26. The upper substrate 21 and lower substrate 22 are in the same size and are in the form of a rectangle. The upper substrate 21 and lower substrate 22 are arranged at a predetermined distance from each other. The lower substrate 22 can be fixed on the surface of the rotor so as to rotate together with the rotor. As shown in FIG. 4, the supporting shaft 23 is fixed in the center of the lower substrate 22 so as to extend vertically upward from the upper surface of the lower substrate 22. The supporting shaft 23 penetrates the center of the upper substrate 21 and extends above the upper surface of the upper substrate 21.

As shown in FIGS. 3 and 4, the timbers 24 are each in the form of a rectangular plate, and disposed on the upper substrate 21 so as to be opposed to each other. The timbers 24 are each attached to a pair of parallel side edges of the upper substrate 21 at the center of each side edge so as to extend vertically upward from the upper surface of the upper substrate 21. The shaft member 25 is slender and mounted in the upper part of each timber 24 so as to be across the timbers 24. The shaft material 25 is parallel to the upper surface of the upper substrate 21, and both ends of the shaft material 25 penetrate the respective timbers 24. When the lower substrate 22 is installed on a rotor, the shaft material 25 is arranged almost parallel to the surface of the rotor. The shaft material 25 is attached to each timber 24 so as to rotate around the central axis thereof. The shaft material 25 has a pair of rotating gears 27, each attached to the inner side of the each timber 24, and a rotation orientation plate 28 attached to one side surface.

The reversing shafts 26 are each slender and disposed below the shaft material 25 attached to the timbers 24, so as to penetrate the respective timbers 24 and project outward from the timbers 24. Each reversing shaft 26 has a reversing gear 29 provided inside each timber 24. The reversing gears 29 each have the same specification as those of the rotating gears 27, and are attached to engage with the respective rotating gear 27. Each reversing shaft 26 rotates with the shaft material 25 via each reversing gear 29 and each rotating gear 27 in the opposite direction to the rotation of the shaft material 25 at the same rotational frequency as the shaft material 25.

As shown in FIGS. 3 and 4, the rotating members 12a and 12b are each in a cylindrical form, and disposed in both ends of the shaft material 25 between each timber 24 and rotating gear 27. Each of the rotating members 12a and 12b is fixed to the shaft material 25 at one end so as to be perpendicular to the shaft material 25, and can rotate around the shaft material 25, which is the central axis, together with the shaft material 25. The rotating members 12a and 12b are shifted by 180 degrees from each other relative to the center of rotation around the shaft material 25, i.e., the central axis of the shaft material 25, while rotating.

As shown in FIGS. 3 and 4, the reversing members 13a and 13b are each in a cylindrical form, and attached to the respective reversing shafts 26 outside the respective timbers 24. Each of the reversing members 13a and 13b is fixed to each reversing shaft 26 at one end so as to be perpendicular to each reversing shaft 26, and is rotatable around each reversing shaft 26, which is the central axis, together with each reversing shaft 26. Moreover, the reversing members 13a and 13b are shifted by 180 degrees from each other relative to the center of rotation around each reversing shaft 26 while rotating. Thereby, the reversing members 13a and 13b are disposed respectively at both ends of the shaft material 25, and can rotate around the respective reversing shafts 26 parallel to the shaft material 25, in the opposite direction to the rotation of each of the rotating members 12a and 12b at the same rotational frequency as each of the rotating members 12a and 12b.

As shown in FIGS. 3 and 4, the rotation-driving unit 14 comprises a rotary motor, and is attached to one reversing shaft 26 inside the timbers 24. The rotation-driving unit 14 is provided to drive the rotation of one reversing shaft 26, thereby, rotating each reversing shaft 26, the shaft material 25, each of the reversing members 13a and 13b, and each of the rotating members 12a and 12b. The rotation-driving unit 14 can control the start and stop of rotation and adjust the rotational speed.

As shown in FIGS. 3 and 4, the control unit 15 comprises an electromagnetic brake 30, a photosensor 31, and a controller 32. As shown in FIG. 4, the electromagnetic brake 30 is fixed to the center of the lower surface of the upper substrate 21. The electromagnetic brake 30 surrounds the peripheral surface of the supporting shaft 23, and enables the supporting shaft 23 to be removable so that the supporting shaft 23 is fixed to the upper substrate 21 or released from the upper substrate 21. By fixing or releasing the supporting shaft 23 to or from the upper substrate 21, the shaft material 25 is fixed to or released from the rotor. As shown in FIGS. 3 and 4, the photosensor 31 is attached to the upper end of one timber 24 above the rotation orientation plate 28, and can detect the rotation of the rotation orientation plate 28 attached to the shaft material 25.

The controller 32 is mounted on the upper surface of the upper substrate 21, and connected to the rotation-driving unit 14, photosensor 31, and electromagnetic brake 30. The controller 32 can control the start and stop of the rotation of the rotation-driving unit 14, and adjust the rotational speed thereof. Moreover, the controller 32 can input a signal from the photosensor 31 on the basis of the rotation of the rotation orientation plate 28. The controller 32 controls the electromagnetic brake 30 based on the signal from the photosensor 31, so that the supporting shaft 23 is removable from the upper substrate 21.

In the specific example shown in FIG. 3, when the lower substrate 22 is installed on a rotor, and when the direction of rotational movement of each of the rotating members 12a and 12b around the shaft material 25 is coincident with the direction of rotational movement of the rotor, thereby accelerating each of the rotating members 12a and 12b, that is, when one rotating member 12a is in the top position while the other rotating member 12b is in the bottom position, the controller 32 releases the fixation of the shaft material 25 to the rotor so that the shaft material 25 is independent of the rotation of the rotor, that is, the controller 32 releases the fixation of the supporting shaft 23 to the upper substrate 21. Moreover, when the direction of rotational movement of each of the rotating members 12a and 12b around the shaft material 25 is opposite to the direction of rotational movement of the rotor, that is, when one rotating member 12b is in the top position while the other rotating member 12a is in the bottom position, the controller 32 fixes the shaft material 25 to the rotor so that the shaft material 25 can rotate with the rotor, that is, the controller 32 fixes the supporting shaft 23 to the upper substrate 21.

As shown in FIGS. 3 and 4, the power generation unit 16 comprises a power unit, and is attached to the center of the upper surface of the upper substrate 21 to cover the upper end of the supporting shaft 23. The power generation unit 16 generates electricity by recovering energy obtained when each of the rotating members 12a and 12b is accelerated by the rotation of the rotor, as the rotation of the upper substrate 21 relative to the lower substrate 22, from the rotation of the supporting shaft 23. The power generation unit 16 is connected to the controller 32 to transmit the generated electricity to the controller 32.

As shown in FIG. 3, the controller 32 is connected to an external electricity recovery system via a cable 34 wired along a wire guiding member 33 that is provided extending upwardly from the upper end of each timber 24. The controller 32 transmits the electricity recovered by the power generation unit 16 to the external electricity recovery system. The controller 32 can supply the electricity recovered by the power generation unit 16 and electricity transmitted from the outside through the cable 34, to the rotation-driving unit 14, photosensor 31, and electromagnetic brake 30.

Thus, the generator 10 recovers energy obtained when each of the rotating members 12a and 12b is accelerated by the rotation of the rotor, and thereby generates electricity by the power generation unit 16. The generator 10 has a simple structure because it does not use a gyroscope. Therefore, the energy loss due to friction or the like can be suppressed, and power generation efficiency can be enhanced.

In the generator 10, since the rotating members 12a and 12b are shifted by 180 degrees from each other relative to the center of rotation around the shaft material 25 while rotating, when the rotor does not rotate, each of the rotating members 12a and 12b can be rotated around the shaft material 25 at a constant angular velocity. Additionally, since the centrifugal force generated by the rotation of each of the rotating members 12a and 12b can be compensated by the rotation of each of the reversing members 13a and 13b, vibration caused by the rotation of each of the rotating members 12a and 12b can be prevented, thereby preventing the device from being damaged.

As shown in FIG. 3, the generator 10 is preferably placed in a vacuum case 35 so that air resistance to the rotation of each of the rotating members 12a and 12b or of each of the reversing members 13a and 13b is eliminated to thereby enhance power generation efficiency.

As shown in FIG. 5, the generator 10 may comprise a rotating plate 51 disposed on the upper substrate 21 along the circumference centering on the supporting shaft 23, the rotating plate 51 having on its upper surface a plurality of intermittent slopes inclined in the same direction along the circumferential direction; a wheel 52 mounted on the upper surface of the rotating plate 51, the wheel 52 rotating along the slopes of the rotating plate 51 by the rotation of the rotating plate 51 so as to be capable of moving up and down; a crankshaft 53 penetrating the center of the wheel 52, the crankshaft 53 being capable of moving up and down together with the up-and-down motion of the wheel 52 relative to the upper substrate 21; a spring 54 that biases the crankshaft 53 to the side of the upper substrate 21 below the crankshaft 53; a rack part 53a formed in the upper part of the crankshaft 53; and a one-way clutch 55 disposed on the shaft material 25 to engage with the rack part 53a, the one-way clutch 55 converting the up-and-down motion of the crankshaft 53 to the rotation of the shaft material 25 in a predetermined direction.

In this generator, the energy obtained when each of the rotating members 12a and 12b is accelerated by the rotation of the rotor can be converted to energy that accelerates the rotation of the shaft material 25, from the rotation of the upper substrate 21 relative to the lower substrate 22 via the rotating plate 51, wheel 52, crankshaft 53, and one-way clutch 55. Accordingly, energy can be recovered from the rotation of the accelerated shaft material 25, with no need to attach the power generation unit 16 to the supporting shaft 23.

REFERENCE SIGNS LIST

10: Generator for a rotor
11: Supporting member
12a and 12b: Rotating members
13a and 13b: Reversing members
14: Rotation-driving unit
15: Control unit
16: Power generation unit
21: Upper substrate
22: Lower substrate
23: Supporting shaft
24: Timber
25: Shaft material
26: Reversing shaft
27: Rotating gear
28: Rotation orientation plate
29: Reversing gear
30: Electromagnetic brake
31: Photosensor
32: Controller

The invention claimed is:

1. A generator for a rotor, generating electricity by recovering rotational energy of a rotor;
the generator comprising a supporting member, a pair of rotating members, a control unit, and a power generation unit;
the supporting member being disposed on the rotor and comprising a lower substrate that can be fixed to the surface of the rotor so as to rotate with the rotor, a supporting shaft fixed to the lower substrate, an upper substrate arranged at a predetermined distance from the lower substrate, timbers mounted on the upper substrate so as to extend vertically upward, and a slender shaft material mounted in the timbers so as to be almost parallel to the surface of the rotor; and the supporting member being capable of fixing the supporting shaft to the upper substrate or releasing the fixation of the supporting shaft to the upper substrate, thereby fixing or releasing the shaft material to or from the rotor;
the rotating members being disposed respectively at both ends of the shaft material so as to be rotatable around the shaft material, which is a central axis, and being shifted by 180 degrees from each other relative to the center of rotation around the shaft material while rotating;
the control unit releasing the fixation of the supporting shaft to the upper substrate so that the shaft material is independent of the rotation of the rotor when the direction of rotational movement of each rotating member around the shaft material is coincident with the direction of rotational movement of the rotor, thereby accelerating both ends of the shaft material as a result of being pulled by each rotating member; and the control unit fixing the supporting shaft to the upper substrate so that the shaft material rotates with the rotor when the direction of rotational movement of each rotating member around the shaft material is opposite to the direction of rotational movement of the rotor;
the power generation unit generating electricity by recovering energy obtained when the both ends of the shaft material are accelerated by the rotation of the rotor, as the rotation of the upper substrate relative to the lower substrate.

* * * * *